Dec. 17, 1968  C. T. ARMENOFF ET AL  3,416,218
METHOD OF FORMING AN EXPANDABLE METALLURGICALLY BONDED
ALUMINUM CELLULAR CORE
Filed Sept. 25, 1964

INVENTORS
CARL T. ARMENOFF
EDWARD L. REED
BY
Henry Kolin
ATTORNEY

United States Patent Office 3,416,218
Patented Dec. 17, 1968

3,416,218
METHOD OF FORMING AN EXPANDABLE METALLURGICALLY BONDED ALUMINUM CELLULAR CORE
Carl T. Armenoff and Edward L. Reed, Woodland Hills, Calif., assignors, by mesne assignments, to North American Rockwell Corporation, a corporation of Delaware
Filed Sept. 25, 1964, Ser. No. 399,310
11 Claims. (Cl. 29—470.9)

ABSTRACT OF THE DISCLOSURE

A method of forming an expandable aluminum honeycomb core structure. Anodized and active areas of predetermined width and spacing are provided on adjacent aluminum foil surfaces, generally in an offset pattern. The active areas are solid-state bonded to form an expandable block of cellular core material. The active areas of aluminum foil are preferably coated with a thin layer of a metal such as silver which eutectically bonds the aluminum members in a metal-to-metal bond.

---

This invention relates to a new and improved method of producing expandable sections or blocks of structural core material. It particularly relates to a method of forming metallurgically bonded aluminum honeycomb core structure.

Various ways have been proposed to manufacture structural honeycomb from continuous webs of sheet material such as paper, resin-impregnated glass, textile fabric, or metal foil. In these various methods, glues or bonding resins have been used for joining selected portions of the sheet material together. Where metal foil, such as aluminum foil, is bonded by a gluing technique, certain disadvantages are inherently present compared with metallurgical bonding of the foils. Thus, glue-assembled joints lack the high-temperature strength associated with metallurgical bonding. Also, the upper temperature limit for glued joints is generally below that at which the metal could normally be employed. Furthermore, because mechanical pressurizing techniques are ordinarily required for effective bonding, this generally imposes a practical limit on the size of the honeycomb structures that may be formed. Additional difficulties are present when attempts are subsequently made to weld or braze metal surface sheets to the upper and lower surfaces of the expanded glue-bonded metal core.

The metallurgical bonding of an aluminum honeycomb structure is particularly desirable because such a bonded structure would posses a high strength-to-weight ratio over a wide temperature range. Such structures would be particularly useful as replacements for the expensive high-strength titanium alloys which are now required in the fabrication of jet planes and space vehicles.

However, attempts to fabricate honeycomb core by a build-up process by spot-welding individual strips of corrugated foil to one another have been unsuccessful because of the fact that the spot-welding operations on the cores themselves are extremely complex. In addition, there is failure to obtain a successful weld between the upper and lower surfacing sheets and the respective core faces. The use of high-temperature brazing material is further unsatisfactory because the temperatures required to melt the high-temperature brazing materials may deleteriously affect the strength and subsequent performance of the metal, particularly aluminum. Also, the use of brazing material further deleteriously affects the strength-to-weight ratio by increasing the total weight present. The formation of a satisfactory metallurgically bonded aluminum core structure is particularly difficult because of the inherent difficulties present in bonding one aluminum surface to another aluminum surface. Thus, the use of conventional brazing materials and techniques results in the formation of poor strength joints between the aluminum surfaces being joined as well as a flow of brazing alloy into the core structure. Thus, attempts to form metallurgically bonded aluminum core structures have until now been unsuccessful, particularly where suitability for large-scale production is a desideratum.

Accordingly, it is an object of the present invention to provide a novel method of forming a metallurgically bonded aluminum core structure.

It is a further object to provide a metallurgical bonding method for forming a honeycomb structure that is readily adaptable to mass production techniques.

It is another object to provide an aluminum core structure that may be used at temperatures limited only by the properties of the aluminum foil itself.

It is yet another object to provide an aluminum core structure that may readily be bonded to surfacing sheets applied to the upper and lower faces of the core.

It is still an additional object to provide a metallurgical bond between aluminum foil in a honeycomb structure that is stronger than bonds heretofore formed.

In acordance with this invention, an expandable metallurgically bonded aluminum core structure is formed by providing both anodized and active areas of predetermined width and spacing on an aluminum foil surface and bonding these active areas to form a predetermined expandable core structure. It is particularly preferred for achieving optimum strength that the active areas of the aluminum foil be coated with a thin layer of metal which will eutectically bond to aluminum. Treated foils are then assembled in a stack so that the metal-coated layers are in a predetermined relationship so as to form a core structure following metallurgical bonding and expansion of the bonded, stacked assembly. The assembly is then heated and maintained at a temperature sufficient to metallurgically bond opposing aluminum foil faces at the areas of contact with metal-coated layers. The formed block of expandable core material may then be readily expanded by any of various known techniques to form a honeycomb type core structure. For structural use, cover plate panels of aluminum are readily adhered to the upper and lower faces of the expanded core.

It is a particularly preferred feature of this invention in providing the aluminum foil surface with anodized and active areas that the entire surface of a pre-cleaned aluminum foil be first anodized. Then strips of anodic deposit are selectively removed from the surface of the aluminum foil, preferably by patterned abrasive blasting, to provide desired areas of both anodized and active strips.

Other objects, features and advantages of this invention will be apparent from the following description and the accompanying drawing in which.

Figure 1:
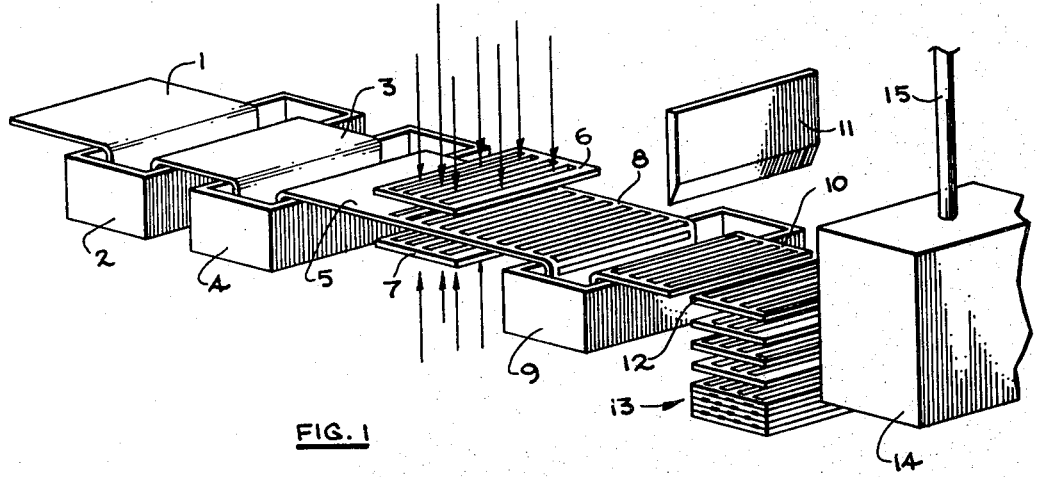
FIG. 1 is a simplified perspective view showing a continuous operation for the practice of this invention.

Referring to FIG. 1, which illustrates, in simplified form, a preferred method of practicing this invention for a continuous operation, a continuous strip of aluminum foil 1 is passed into a conventional aluminum cleaning bath 2. Any of various systems of drive shafts, guide rollers and the like, not shown, may be utilized for advancing the aluminum foil in this continuous operation.

The aluminum foil used may vary in thickness from 0.5 mil to 30 mils (0.0005–0.030 inches), although where large structures are desired a workable range up to 100 mils is feasible. It will, of course, be understood that the thinner the foil, the smaller can be the cell size that is formed. Thus, cells may vary in size from $\frac{1}{16}$-inch across to up to a foot. Generally, a cell between one-eighth inch and two inches will be preferred because of the ease in handling and the high strength-to-weight ratio obtained therewith. The aluminum foil itself may be up to six feet or even wider, depending on the end use contemplated and foil-conveying equipment available.

The present process is particularly suitable for forming honeycomb cores of high strength-to-weight ratios from all classes of aluminum metals and commercially available aluminum alloys, including dispersion-strengthened aluminum consisting of about 4–12 weight percent aluminum oxide dispersed in an aluminum matrix. Unless otherwise indicated, the term aluminum as used in the specification and claims is understood to generically embrace both aluminum metal per se and aluminum alloys.

Any of the well-known cleaning techniques utilized for cleaning aluminum may be used, chemical cleaning being preferred. Where required, there may be a preliminary vacuum out-gasing before immersion of the foil in the cleaning bath. The cleaning operation shown in FIG. 1 will ordinarily include a conventional cleaning sequence such as the use of an alkaline cleaner, followed by a water rinse, followed by an acid rinse, followed by another water rinse.

The cleaned foil 3 is then passed into an anodizing bath 4 whereby a thin aluminum oxide film 5 is formed on both surfaces of the aluminum foil, the aluminum serving as anode in an electrolytic bath. The aluminum oxide film serves to prevent bonding in areas where it is not wanted and to act as a mask to allow the silver to plate only in the bonding areas. Any standard procedure for anodizing or oxidizing aluminum surface may be used. However, a chromic acid electrolytic anodizing treatment is preferred because contaminants are easily removed from the film and because its thickness is easily controlled. The aluminum oxide film need be only thick enough to prevent bonding in areas where bonding is not wanted. Ordinarily, the film may vary from 0.01 to 1 mil in thickness. Conveniently, an anodic deposit between 0.02 and 0.1 mil is preferred.

The anodized foil is then passed to a stripping zone where strips of anodic deposit of predetermined width and spacing are removed from both surfaces, preferably by use of multiple abrasive jets blasting the surface through positioned masks 6 and 7 which form the desired pattern. Conveniently, alumina, glass beads, silicon oxide or other abrasive material may be used. Glass beads in a 200–400 mesh U.S. standard sieve size are non-entrapping and are therefore preferred. Masks 6 and 7 are disposed with respect to one another and the aluminum foil so that the active areas from which the anodic deposits are stripped are in an offset pattern with respect to the obverse and reverse sides of the foil. It will, of course, be understood that the masks may also be arranged so that the strips are in a longitudinal pattern with respect to the direction of travel of the foil. Where desired, the masks may be arranged to move with the moving foil until the stripping operation has been accomplished.

The pattern foil 8 containing the anodized and active areas of predetermined width and spacing is then passed into a conventional silver plating bath 9, e.g., a silver cyanide plating bath, whereby a layer of silver is deposited on the active areas from which the oxide layer had been removed. The silver layer is approximately the thickness of the anodic coating. For optimum bonding results in the subsequent heat treatment, the preferred thickness of the silver deposit is between $10^{-3}$ and $10^{-5}$ inches. While thicker films can be applied, the resultant bond strength may be reduced. A thicker silver layer may also cause bonding in unwanted areas due to the flow of the molten silver-aluminum eutectic. If desired, the aluminum foil may be given a preliminary zincating treatment by immersion in a zincating solution followed by a distilled water wash prior to silver plating. Also, in place of a silver layer, a layer of copper, gold, tin, or zinc may be deposited electrolytically for subsequent bonding.

The silver-plated foil 10 is then forwarded from the plating bath 9 by means of a series of conventional guide and idler rollers, not shown, to a cutting station 11 where a cutter such as a rotary cutter shears the foil into desired lengths. It will readily be understood that by regulating the rotary speed of the cutter in appropriate relation to the speed of the moving foil being forwarded into contact with the cutter, the foil may be automatically cut into individual sections or sheets 12 of uniform size and stacked together in relationship to form an unbonded block 13 of preselected honeycomb structure. Sheets of 20 to 30 feet in length or longer may be stacked in up to several thousand layers depending only on equipment-handling capacity and end requirements.

The unbonded block 13 is then conveyed into a furnace 14 for the bonding operation. Bonding is accomplished by applying heat and pressure to the assembled stack of aluminum sheets under a controlled atmosphere. In order to achieve a controlled atmosphere, the stack of aluminum is preferably enclosed in a sheet metal envelope. This permits the assembly to be purged of contaminating gases and vapors. While it is desirable that the bonding be accomplished under vacuum conditions in the envelope, bonding can also take place in the presence of an inert atmosphere such as argon gas, or less desirably in the presence of air. Pressure means 15 indicates that pressure can be applied mechanically with a press or isostatically with gas. With the bonding of aluminum using the eutectic process, only sufficient pressure is necessary to cause the surfaces to be bonded to contact each other, preferably in intimate contact.

In the present invention, by providing anodized and active areas of predetermined width and spacing, and then coating the active area with a metal that will eutectically bond with the aluminum, a metallurgically bonded aluminum honeycomb core structure is obtained having uniquely superior properties. It is particularly preferred that the method of bonding one aluminum foil surface to another at the points of contact of active areas be performed in accordance with the teaching of the invention set forth in S.N. 53,629, filed Sept. 2, 1960, of Briggs et al., entitled "Method of Bonding Aluminum Members" now U.S. Patent 3,180,022 and assigned to the assignee of the present invention. This method provides a means of forming a direct bond between two aluminum members, and is particularly suitable and adapted to the process of the present invention because of the small amount of bonding agent used and because of the superior strength of the joint which results from this type of eutectic bonding. For full details of this method, reference should be made to this copending application. Basically there is provided on at least one mating surface, a thin layer of a bonding metal selected from the group consisting of silver, copper, gold, tin, and zinc, which form suitable eutectics with aluminum. The mating surfaces are then brought into intimate contact, and the resulting assembly is heated at a temperature between the eutectic formation temperature and the melting point of the aluminum members, until the members are joined. In practice, the thin layer of bonding metal, preferably silver, is applied to at least one of the surfaces of the members being joined. Desirably the film is no thicker than about $10^{-3}$ inches, while a film of about $10^{-4}$ to $10^{-5}$ inches is preferred. The temperature at which bond formation takes place depends upon the particular eutectic bonding agent employed. The eutectic temperature is about 468° F. for eutectic formation between tin and an aluminum member, 720° F. for zinc, 980° F. for gold, about 1012° F. for copper, and about 1030° F. for silver. It is desirable to exceed the eutectic formation temperature for the particular eutectic material by about 30 to 60° F., in order to promote diffusion of the eutectic into the parent material and formation of a thin interface which adds considerably to the quality of the resulting bond. Effectively by maintaining the bonding temperature for a sufficient time, a direct bond between the joined members is formed by diffusion of the formed eutectic away from the interface into the members. For silver eutectic bonding, a highly satisfactory temperature is about 1060–1090° F., with a temperature of about 1080° F. being preferred.

The heating step in furance 14 preferably performed under initially vacuum conditions. However, the maintaining of intimate contact between the surfaces being joined is sufficient to prevent oxidation at the interface as the temperature is being raised. Thus air heating, by such means as an induction coil, may be used as a production method.

The block of bonded unexpanded honeycomb is removed from the furnace and cooled. It may be given a conventional heat treatment to impart maximum strength and corrosion resistance where certain aluminum alloys are used to form the block of honeycomb. To expand this block, the ends may be conveniently gripped and pulled apart for desired cell expansion.

The present process is basically subject only to limitations inherent in desired end use. Thus films, foils, or sheets may be used, and layers of several thousand individual sheets may be bonded together. Utilizing existing available equipment, the individual sheets forming the foil may be up to 6 feet or more in width and as much as 20–30 feet long.

In providing the aluminum foil surface with anodized and active areas, the aluminum surface may first be provided with an adherent mask such as an organic paint, and only the unmasked portions will then be anodized. Upon stripping or dissolving the mask, active areas will be left which will then be metal coated. However, it is generally preferred first to anodize completely both surfaces of the aluminum foil and then selectively remove strips of anodic deposit of predetermined width and spacing from both surfaces to thereby form anodized and active areas. Electrolytic treatment in a chromic acid bath is a convenient and preferred anodizing method because this reagent leaves a thin coating, is not trapped in the aluminum surface, and is easily washed off. However, as is well understood in this art, in addition to electrolytic anodizing in a chromic acid bath, various chemical treatments and heat treatments may also be used to provide an aluminum oxide coating that is similar to an anodically deposited coating. Thus the term anodized coating is considered to include such equivalent coatings.

Portions of the anodized aluminum oxide layer may also be removed in a chemical manner. For example, an alkaline gel may be silk-screened or offset-printed onto the surface of the aluminum foil in desired configuration so as to selectively remove aluminum oxide strips. The amount of caustic in the gel can be controlled to etch through the oxide layer to the metal surface. After the etching procedure the caustic would be rinsed off leaving a bonding pattern on the surface of the aluminum. Or an alkaline solvent may be sprayed through a stencil or passed through a perforated drum over which the aluminum foil passes. The use of multiple abrasive jets blasting through mask onto the moving sheet of aluminum enables the technique to be used on a high production basis. Thus the abrasive blast through a mask appears more precise and is preferred. Abrasive particles are readily removed from the aluminum foil surface by blowing with dry gas.

Silver may be applied to the active areas by vacuum deposition. Or silver may be applied to the aluminum foil by plating through a resist mask or by the application of silver foil strips and wires. However, the technique of plating aluminum which has been oxidized and then selectively etched is preferred, silver being the preferred plating agent because of its over-all suitability.

By the application of higher bonding pressures and increased bonding times, it is possible to cause the aluminum to bond in etched areas without the addition of silver through the use of solid state diffusion. However, the use of silver is desirable and preferable because it permits bonding to take place over a wider range of conditions. If the aluminum is being bonded by solid state diffusion, higher pressures for longer periods of time are necessary.

Figure 2:
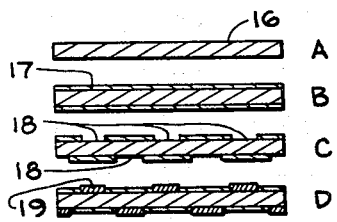
FIG. 2 is a cross-sectional view of foils arranged in a treatment sequence according to a preferred manner of practicing the invention.

In FIG. 2 is shown the sequence of operations for the preferred method of practicing this invention. An aluminum foil 16 is cleaned in step A and then provided with an anodized aluminum oxide layer 17 over each surface as shown in step B. In step C, portions of the aluminum oxide layers 17 have been removed, for example by abrasive blasting, to provide active oxide-free areas 18 in an offset pattern with respect to obverse and reverse sides. In step D is shown the deposition of thin layers 19 of silver in the active areas thereby providing alternate strips of anodized and silver-coated areas.

Figure 3:
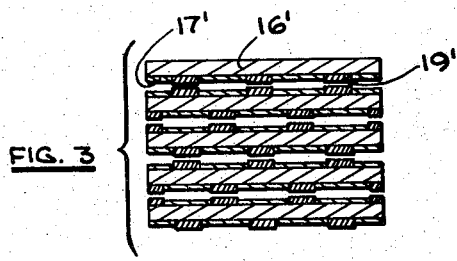
FIG. 3 is a cross-sectional view of treated, unbonded foils showing one manner of assembling these foils for bonding to form an expandable honeycomb core in accordance with this invention.
Figure 4:
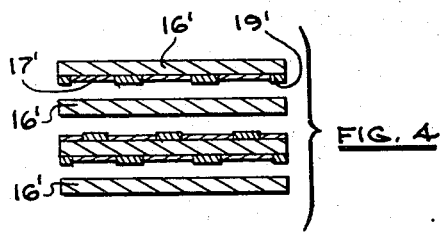
FIG. 4 is a cross-sectional view of treated and untreated aluminum foils arranged in another foil assembly for bonding in accordance with this invention.

In FIG. 3, is shown a preferred assembly of unbonded sheets for the practice of this invention for providing a honeycomb core structure. It will, of course, be realized that utilizing the process of the present invention, many different types of geometric arrangements and patterns may be utilized to provide different core structures having high strength-to-weight ratios. The honeycomb structure provided by the assembly shown in FIG. 3, wherein corresponding parts are labeled as in FIG. 2, has the anodized and active areas so disposed that an offset pattern is formed with respect to obverse and reverse sides of the treated aluminum foil. When the foils are assembled into a stack before bonding, the opposing metal-coated layers will be in alignment, so that metallurgical bonding of the opposing faces will occur at the areas of contact of the metal-coated layers. There will be no adherence of the aluminum foils at other than these points of contact, because no adherence will be obtained at points of contact with aluminum oxide. When the aluminum assembly is heated to a temperature intermediate that of eutectic formation and that of the melting point of the aluminum, the eutectic formed will be molten and will diffuse from the interface into both surfaces thereby forming essentially a direct aluminum to aluminum bond.

Where the unbonded assembly arrangement shown in FIG. 4 is used, sheets of pre-cleaned aluminum foil are substituted for the alternate layers present in the configuration shown in FIG. 3. Conventional cleaning of the foil is ordinarily sufficient to provide an active layer. Counting from the top, sheets 2 and 4 of FIG. 4 will correspond to sheets 2 and 4 of FIG. 3. The honeycomb structure that is formed will be essentially identical for both assemblies. For the structure shown in FIG. 4, bonding will occur similarly to that for the structure shown in FIG. 3. Thus the silver layer 19' in contact with the active faces of aluminum foil 16' will bond thereto at the point of contact by diffusion of the molten silver eutectic into the aluminum surface. In employing the preferred eutectic bonding technique of the copending invention in conjunction with the present invention, it is noted that the particular bonding metal used need be present on only one of the surfaces to be joined. Thus bonding will take place with equal convenience for the configuration shown in FIG. 4 as well as for that shown in FIG. 3.

For solid-state bonding, only active and oxidized areas need be provided, there being no subsequent metal coating of the active areas. Bonding will then occur directly between active aluminum faces without any intermediate eutectic formation.

Other geometric configurations will readily suggest themselves that may be employed utilizing the process of the present invention. Thus using the basic structure shown in FIG. 3, alternate sheets of pre-cleaned aluminum may be interposed between each of the sheets shown in FIG. 3. At the points of contact with the metal-coated silver layers, bonding will take place with the interposed aluminum sheets. The resulting core structure will be a distorted hexagon.

Figure 5:
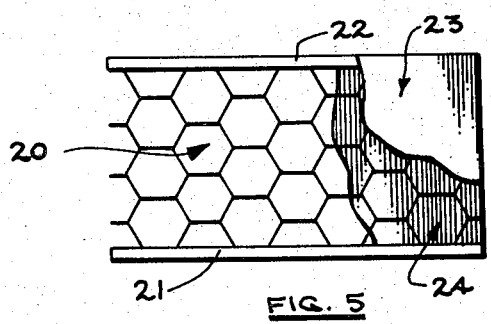
FIG. 5 shows a cross-sectional view of the resulting expanded honeycomb structure.

Unexpanded bonded blocks of honeycomb core structure are conveniently shipped as such and then may be expanded at the point of use. As shown in FIG. 5, the honeycomb core cell structure 20 may be obtained in expanded form by pulling plates 21 and 22 apart. For a completed structural member, aluminum cover plates 23 and 24 may be readily and conveniently joined to the upper and lower surfaces of the honeycomb structure 20 by using the metallurgical bonding eutectic diffusion technique of the copending application. Heretofore, the brazing of aluminum plates to the upper and lower surfaces of aluminum honeycomb bonded by an adhesive technique has presented considerable difficulty because of the need to heat the aluminum to a temperature destructive of glue strength where a satisfactory metallurgical bond between the plate and the honeycomb structure is desired.

The continuous process shown in FIG. 1 is provided by way of illustration of a preferred manner of practicing this invention, but batch and semi-continuous processes may also be employed. It will of course be readily apparent that many modifications may be made with respect to the various mechanical devices and arrangements that may be utilized to convey the aluminum foil in and out of the several baths and through the cutting and stacking operations and through the furnace for the bonding treatment. Practice of the present invention in its broader aspects is therefore clearly not limited to the equipment illustrating a continuous operation process. Various mechanical arrangements may conventionally be employed to interpose sheets of pre-cleaned aluminum with active aluminum surfaces where it is desired to form honeycomb in the manner illustrated in FIG. 4; similarly, aluminum foil sheets may be interposed between each of the treated foils shown in FIG. 3.

By way of description, not intended as a limitation on the process, in an illustrative run 4 x 4 inch sheets of No. 1100 aluminum alloy foil, 4 mils (0.004 inch) thick were cleaned in an alkaline phosphate cleaning bath for 15 seconds at 160° F. The foils were then rinsed in distilled water followed by a rinse in 50% nitric acid at room temperature to desmut the aluminum foils, followed by another rinse in distilled water.

The cleaned aluminum foils were then anodized electrolytically in a concentrated chromic acid bath employing 40 volts at an initial current density of 4 amperes per square foot for about a half hour. The anodized sheets of foil were then rinsed in distilled water and dried by passage of warm argon gas thereover.

The anodized sheets were placed between metal masks containing slotted openings, and were abrasive-blasted from both sides with −300 mesh (U.S. standard sieve size) aluminum oxide until the anodized layers beneath the openings had been removed, approximately 5 minutes being required. The metal masks were arranged so that the grit-blasted strips formed an offset pattern with respect to obverse and reverse sides of the sheets. Loose abrasive was blown off with dry clean air. The sheets were then washed with distilled water and placed in a conventional silver cyanide plating solution for approximately 30 seconds at 6 volts using a current density of 4 amperes per square foot of exposed surface. The silver plate was about 50 micro-inches thick, as determined by a beta-ray back-scattering gauge. The plated foils were rinsed and dried. A stack consisting of 22 treated sheets was assembled, and the assembly was placed in a stainless steel envelope with glide sheets of stainless steel maintained on the inside of the pack. The envelope was sealed by welding, purged using alternate evacuation and back filling with argon, and then sealed off under vacuum. The sealed envelope was placed in a heated autoclave pressurized to about 3000 pounds and maintained for 15–30 minutes at 1070° F. The furnace was cooled, and a block of unbonded material was readily expanded by a pulling force at the end sections.

Although the present invention has been described in considerable detail for purposes of illustration and clarity of understanding, it will be readily apparent that various changes and modifications may be made within the spirit of the invention. Accordingly, the invention should be considered as limited only in accordance with the objects and the claims thereof.

We claim:
1. The method of forming an expandable metallurgically bonded aluminum cellular core structure comprising in combination: providing an aluminum foil surface with anodized areas and non-anodized active areas of predetermined width and spacing; assembling treated foil portions with active areas in contact in relationship to form a predetermined cellular core structure; and heating the assembly at a temperature sufficient to solid-state bond opposing foil faces at the points of contact of active areas without bonding in the anodized areas, thereby forming a block of expandable cellular core material.

2. The method of forming an expandable metallurgically bonded aluminum cellular core structure comprising in combination: providing an aluminum foil surface with anodized areas and non-anodized active areas of predetermined width and spacing; coating the active areas of the aluminum foil with a thin layer of metal selected from the class consisting of silver, gold, copper, tin, and zinc; assembling treated foil portions with metal-coated layers in relationship to form a predetermined cellular core structure; and heating the assembly at a temperature sufficient to solid-state bond opposing foil faces at the areas of contact with the metal-coated layers without bonding in the anodized areas, thereby forming a block of expandable cellular core material.

3. The method of forming an expandable metallurgically bonded aluminum cellular core structure comprising in combination: providing an aluminum foil surface with anodized areas and non-anodized active areas of predetermined width and spacing; coating active areas of the aluminum foil with a layer of less than $10^{-3}$ inches of silver; assembling treated foil portions with silver-coated layers in relationship to form a predetermined cellular core structure, heating the resulting assembly at a temperature between the eutectic formation temperature of silver and aluminum and the melting point of the aluminum foil to form a eutectic of silver and aluminum at the interface of said foil; and maintaining said temperature for a sufficient time to form a direct bond between the joined aluminum surfaces by diffusion of the formed eutectic away from the interface into said foil without bonding in the anodized areas, thereby forming a block of expandable cellular core material.

4. The method of forming an expandable metallurgically bonded aluminum core structure which comprises anodizing both surfaces of pre-cleaned aluminum foil; selectively removing strips of anodic deposit of predetermined width and spacing from both surfaces of the aluminum foil to form anodized strips and active strips in offset patern with respect to obverse and reverse sides; coating the active areas of the aluminum foil with a thin layer of metal selected from the class consisting of silver, gold, copper, tin, and zinc; assembling treated foil portions with metal-coated layers in relationship to form a predetermined cellular core structure; and heating the resulting assembly at a temperature sufficient to solid state bond opposing foil faces at the areas of contact with the metal-coated layers without bonding in the areas of the anodized strips, thereby forming a block of expandable cellular honeycomb material.

5. The method according to claim 4 wherein treated foils are assembled with opposing metal-coated layers in alignment, so that the metallurgical bonding of opposing face occurs at the areas of contact between coated layers on both faces.

6. The method according to claim 4 wherein aluminum sheets with active surfaces are assembled in alternating relationship with treated foils having surfaces with anodized and active areas of predetermined width and spacing, so that metallurgical bonding of opposing faces occurs at the areas of contact between the metal-coated layer and the uncoated active aluminum surface.

7. The method according to claim 4 wherein said metal-coated layer consists of less than $10^{-3}$ inches of silver.

8. The method of forming an expandable metallurgically bonded aluminum honeycomb core structure comprising in combination anodizing both surfaces of pre-cleaned aluminum foil; selectively removing strips of anodic deposit of predetermined width and spacing from both surfaces of the aluminum foil by abrasive blasting of both surfaces through stencils so designed and arranged so that there are formed anodized strips and anodic-deposit-free strips in offset pattern with respect to obverse and reverse sides; electrolytically coating the active areas of the aluminum foil with a thin layer of less than $10^{-3}$ inches of metal selected from the class consisting of silver, gold, copper, tin, and zinc; assembling the foils into a stack with opposing metal-coated layers in alignment; and heating the stack at a temperature sufficient to solid-state bond opposing faces at the areas of contact with the coated layers without bonding in the areas of the anodized strips, thereby forming an unexpanded block of expandable honeycomb material.

9. The method according to claim 8 wherein a layer of silver of less than $10^{-3}$ inches is electrolytically deposited on the active aluminum areas, and the assembly is heated at a temperature of about 1060–1090° F. to form a eutectic of silver and aluminum at the interface of the aluminum foils, and maintaining said temperature for a sufficient time to form a direct bond between the joined foils by diffusion of the formed eutectic away from the interface into the foils.

10. The method according to claim 8 wherein the unexpanded block of honeycomb material is expanded to form a cellular honeycomb structure, and metal cover plates are metallurgically bonded to opposite faces of the expanded honeycomb core.

11. The method of forming an expandable metallurgically bonded aluminum cellular core structure comprising in combination: providing anodized bond surfaces of pre-cleaned aluminum foil; selectively removing strips of anodic deposit of predetermined width and spacing from both surfaces of the aluminum foil to form anodized strips and active strips in offset pattern with respect to obverse and reverse sides; assembling treated foil portions with active areas in contact in relationship to form a predetermined parallel core structure and heating the assembly at a temperature sufficient to solid-state bond opposing foil faces at the points of contact of active areas without bonding in the areas of the anodized strips, thereby forming a block of expandable cellular core material.

References Cited
UNITED STATES PATENTS

| | | | |
|---|---|---|---|
| 2,466,890 | 4/1949 | Gilbertson | 29—482 |
| 2,999,306 | 9/1961 | Baxter | 24—157.3 |
| 3,001,277 | 9/1961 | Giovannucci | 29—502 X |
| 3,016,450 | 1/1962 | Keeleric. | |
| 3,121,785 | 2/1964 | Terrill et al. | 29—492 X |
| 3,123,908 | 3/1964 | Boller | 29—471.1 |
| 3,180,022 | 4/1965 | Briggs et al. | 29—487 |
| 3,206,847 | 9/1965 | Keeleric | 29—497.5 X |
| 3,369,288 | 2/1968 | Halnan | 29—502 X |

FOREIGN PATENTS 714,510  Great Britain.

CHARLIE T. MOON, Primary Examiner.

U.S. Cl. X.R.

29—472.3, 480, 498, 504